M. C. Boyer.
Shaft-Coupling.

Nº 72264. Patented Dec. 17, 1867.

Witnesses

Inventor.

United States Patent Office.

M. C. BOYER, OF NORRISTOWN, PENNSYLVANIA.

Letters Patent No. 72,264, dated December 17, 1867.

IMPROVEMENT IN SHAFT-COUPLING.

The Schedule referred to in these Letters Patent and making part of the same.

TO ALL WHOM IT MAY CONCERN:

Be it known that I, M. C. BOYER, of Norristown, Montgomery county, Pennsylvania, have invented an improved Shaft-Coupling; and I do hereby declare the following to be a full, clear, and exact description of the same.

My invention consists of two clamps adapted to the ends of two adjoining shafts, and having tapering screws for receiving certain nuts, all as described hereafter, so as to form a cheap, simple, and effective coupling.

In order to enable others skilled in the art to make and apply my invention, I will now proceed to describe the mode of carrying the same into effect, reference being had to the accompanying drawing, which forms a part of this specification, and in which—

Figure 1:
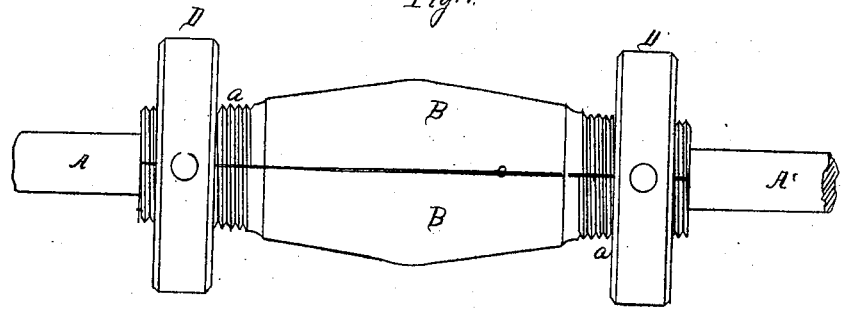
Figure 3:
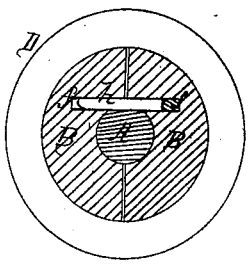
Figure 2:
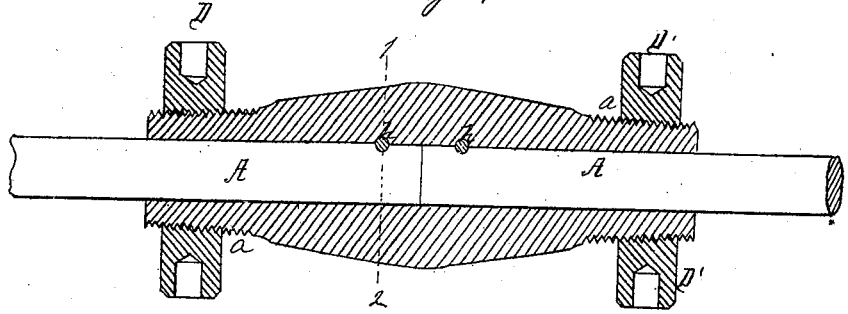

Figure 1 is a front view of my improved shaft-coupling,

Figure 2, the same with one of the coupling-clamps removed and the nuts in section, and Figure 3 a transverse section on the line 1–2, fig. 2.

Similar letters refer to similar parts throughout the several views.

A and A' are the ends of two adjoining shafts, B and B' the two coupling-clamps, and D and D' two nuts, which bind the clamps to the shafts. The two clamps may be cast in one piece in the first instance, then bored out to suit the shafts, and then have a tapering screw, $a$, formed at each end, as shown in the drawing, the threads of the screwed portions being adapted to internal threads in the nuts D D'. After this the piece to be converted into the two clamps is severed longitudinally by a tool, which will remove so much of the metal that when the severed pieces or clamps are applied to the shafts, there will be a narrow intervening space between them. On applying the nuts to the tapering screws $a$, and turning them tight on the same, the two shafts will be grasped by and between the coupling-clamps with so tight a grip that they cannot turn or move longitudinally independently of each other or the coupling, unless excessive strain be imparted to the shafts. In order to afford additional security, I drill two holes, $ff$, one in each clamp B and B' of the coupling, for the admission of a pin, $h$, as shown in fig. 3, the holes being so situated that a portion of one pin will fit into a notch in one shaft, and a portion of the other pin into a notch in the other shaft, as shown in fig. 2

I claim as my invention, and desire to secure by Letters Patent—

The within-described coupling, composed of the two clamps B and B', adapted to the shafts, and nuts D and D', adapted to tapering screws $a\ a$ on the clamps, all as set forth, and for the purpose specified.

In testimony whereof, I have signed my name to this specification in the presence of two subscribing witnesses.

M. C. BOYER.

Witnesses:
CHARLES E. FOSTER,
CHARLES B. PRICE.